United States Patent
Kels et al.

(10) Patent No.: US 11,582,255 B2
(45) Date of Patent: Feb. 14, 2023

(54) DYSFUNCTIONAL DEVICE DETECTION TOOL

(71) Applicant: MICROSOFT TECHNOLOGY LICENSING, LLC, Redmond, WA (US)

(72) Inventors: Shay Kels, Givatayim (IL); Jonathan Bar Or, Seattle, WA (US); Corina Feuerstein, Herzliya (IL); Amir Kutcher, Kiryat Motzkin (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 122 days.

(21) Appl. No.: 17/127,341

(22) Filed: Dec. 18, 2020

(65) Prior Publication Data
US 2022/0201023 A1    Jun. 23, 2022

(51) Int. Cl.
*H04L 9/40* (2022.01)
*G06N 20/00* (2019.01)
(Continued)

(52) U.S. Cl.
CPC ........ *H04L 63/1425* (2013.01); *G06N 20/00* (2019.01); *H04L 43/0817* (2013.01);
(Continued)

(58) Field of Classification Search
None
See application file for complete search history.

(56) References Cited

U.S. PATENT DOCUMENTS

| 7,680,624 B2 | 3/2010 | Mcelfresh et al. |
| 9,032,522 B1 | 5/2015 | Mulder et al. |

(Continued)

OTHER PUBLICATIONS

"DHCP Liveness Detection", Retrieved from: https://www.juniper.net/documentation/en_US/junos/topics/topic-map/dhcp-liveness-detection.html#id-dhcp-liveness-detection-using-arp-and-neighbor-discovery-packets, Dec. 13, 2020, 32 Pages.
(Continued)

*Primary Examiner* — Anh Nguyen
(74) *Attorney, Agent, or Firm* — Shook, Hardy & Bacon L.L.P.

(57) ABSTRACT

Embodiments of the present disclosure provide systems, methods, and non-transitory computer storage media for detecting abnormal behavior of device in an enterprise network based on an analysis of behavioral information of the device's neighbors in network. At a high level, embodiments of the present disclosure employ a hive-mind approach to determine anomalous behavior of a device in a network based on analyzing behavior information reported by neighboring devices within the network. Embodiments identify that a device is alive and connected within the network based on multiple neighboring devices reporting behavioral information about the device; however, the device may be dysfunctional and failing to report its own information. By aggregating and analyzing behavioral information of a device based on the reporting information of its neighboring devices, embodiments of the present disclosure are able to determine whether a device is healthy even when the device is unable to report its own information.

20 Claims, 7 Drawing Sheets

(51) Int. Cl.
*H04L 61/4511* (2022.01)
*H04L 43/0817* (2022.01)
*H04L 43/10* (2022.01)
*H04L 61/103* (2022.01)

(52) U.S. Cl.
CPC ............ *H04L 43/10* (2013.01); *H04L 61/103* (2013.01); *H04L 61/4511* (2022.05); *H04L 63/1433* (2013.01)

(56) References Cited

U.S. PATENT DOCUMENTS

| | | | |
|---|---|---|---|
| 10,148,686 | B2 | 12/2018 | Hassanzadeh et al. |
| 10,623,273 | B2 | 4/2020 | Di Pietro et al. |
| 2019/0007447 | A1 | 1/2019 | Barnes |
| 2019/0141058 | A1 | 5/2019 | Hassanzadeh et al. |
| 2019/0281078 | A1 | 9/2019 | Eguiarte Salazar et al. |
| 2019/0306011 | A1* | 10/2019 | Fenoglio .................. H04L 43/04 |
| 2020/0412603 | A1* | 12/2020 | Cai .......................... H04L 43/10 |
| 2022/0103591 | A1* | 3/2022 | Maturana .............. G06F 21/552 |

OTHER PUBLICATIONS

"IP Addressing: ARP Configuration Guide, Cisco IOS Release 15M&T", Retrieved from: https://www.cisco.com/c/en/us/td/docs/ios-xml/ios/ipaddr_arp/configuration/15-mt/arp-15-mt-book/arp-config-arp.html, Dec. 3, 2012, 18 Pages.

"NDP Proxy", Retrieved from: https://docs.paloaltonetworks.com/pan-os/7-1/pan-os-admin/networking/nptv6/ndp-proxy, Jul. 7, 2020, 2 Pages.

Borkar, Pramod, "IPS Security: How Active Security Saves Time and Stops Attacks in their Tracks", Retrieved from: https://www.exabeam.com/ueba/ips-security-how-active-security-saves-time-and-stop-attacks-in-their-tracks/, Jan. 17, 2019, 15 Pages.

Gayhardt, et al., "Smart Detection—Failure Anomalies", Retrieved from: https://docs.microsoft.com/en-us/azure/azure-monitor/app/proactive-failure-diagnostics, Dec. 18, 2018, 16 Pages.

Lavrentyev, Andrey, "MLAD: Machine Learning for Anomaly Detection", Retrieved from: https://ics-cert.kaspersky.com/reports/2018/01/16/mlad-machine-learning-for-anomaly-detection/, Jan. 16, 2018, 9 Pages.

Narten, et al., "Neighbor Discovery for IP version 6 (IPv6)", Retrieved from: https://tools.ietf.org/html/rfc4861#section-7.3, Sep. 2007, 98 Pages.

Sagir, et al., "Get Behavioral Analytics and Anomaly Detection", Retrieved from: https://docs.microsoft.com/en-us/cloud-app-security/anomaly-detection-policy, Jan. 5, 2021, 13 Pages.

Wedgbury, et al., "Automated Asset Discovery in Industrial Control Systems—Exploring the Problem", In Proceedings of the 3rd International Symposium for ICS & SCADA Cyber Security Research, Sep. 17, 2015, pp. 73-83.

Yossifon, Yossi, "Failure Anomalies Alert now Detects Dependency Failures", Retrieved from: https://azure.microsoft.com/en-us/blog/failure-anomalies-alert-now-detects-dependency-failures/, Jan. 18, 2017, 5 Pages.

Zydyk, et al., "Address Resolution Protocol (ARP)", Retrieved from: https://searchnetworking.techtarget.com/definition/Address-Resolution-Protocol-ARP, Retrieved Date: Feb. 2, 2021, 3 Pages.

Serrat-Olmos, et al., "Accurate Detection of Black Holes in MANETs using Collaborative Bayesian Watchdogs", In Proceedings of IFIP Wireless Days, Nov. 21, 2012, 6 Pages.

"International Search Report and Written Opinion Issued in PCT Application No. PCT/US2021/058400", dated Feb. 16, 2022, 5 Pages.

Sun, et al., "Intrusion Detection Techniques in Mobile Ad Hoc and Wireless Sensor Networks", In Journal of IEEE Wireless Communications, vol. 14, Issue 5, Oct. 1, 2007, pp. 56-63.

* cited by examiner

DYSFUNCTIONAL DEVICE DETECTION TOOL

BACKGROUND

Generally, companies conduct continuous analysis on computing device behavior within an enterprise to ensure that all computing devices and operations are running properly. In some instances, this analysis provides an enterprise and information security team critical information that may be used to thwart potentially malicious tasks. To gain these insights, enterprise and information security teams typically review certain telemetry data and information derived or created from computing devices and software agents or similar computer programs operating in the network. For example, these teams may monitor device behavior by observing reporting data to ensure a particular device is alive and reporting. For instance, a computing device may be considered alive where the device is operating as expected. However, this monitoring process is prone to error when a device is alive but stops reporting on its status and health. As such, conventional approaches for identifying abnormal or potentially harmful behavior within an enterprise network remain deficient.

SUMMARY

Various aspects of the technology described herein are generally directed to systems, methods, and computer storage media, for among other things, monitoring device and software behavior to identify abnormal behavior in an enterprise network. In particular, in some embodiments, abnormal behaviors may be detected by analyzing behavioral information among neighboring devices in a computing environment (e.g., enterprise network, a distributed computing environment, etc.). For example, some embodiments can determine whether a device is failing, being tampered with, or exhibiting abnormal behavior when the device has stopped reporting behavioral information, yet the device is still active in the enterprise network, based at least in part on behavioral information associated with the device reported by neighboring devices. Further, some embodiments can distinguish between malicious abnormal behavior and non-malicious abnormal behavior by using anomaly detection logic, which may comprise a machine-learning model that is trained on specific information about the device, the device's behavior, or other information about the network environment. For example, in some of these embodiments, the model (or anomaly detection logic) is utilized to score behavioral information received from multiple neighboring devices, and based on the score(s), determine whether reported behavioral information of a particular device is potentially indicative of malicious activity or benign abnormal operating behavior. According to one embodiment, a dysfunctional device detector of an abnormal behavior detection system in the computing environment can identify abnormal behavior with an enterprise network by analyzing behavioral information of multiple neighboring devices and, using a trained machine-learning model, score the behavioral information to determine whether the score exceeds an anomaly threshold. In this manner, embodiments of the present disclosure employ a "hive-mind" or collective-intelligence approach to determine anomalous behavior of a device in a network based on analyzing behavior information reported by neighboring devices within the network. Accordingly, embodiments utilizing a trained machine-learning model(s) can learn and distinguish normal reporting patterns of devices within a network from abnormal activity, which enables the trained machine-learning model to more efficiently and accurately predict when a device is dysfunctional or exhibiting abnormal behavior, and in some embodiments further determine whether the dysfunction is likely malicious or benign or other information about the nature of the dysfunction.

According to the operation of an embodiment using a hive-mind or a collective-intelligence technique, multiple devices connected to the same network segment may report behavioral information to a cloud service. The behavioral information reported by each device may comprise information related to the device itself in combination with information analyzed from neighboring devices. For example, device A may report to a cloud service that it is alive and that devices B and C are also alive. To analyze whether a neighboring device is alive, embodiments leverage Address Resolution Protocol (ARP) to map network addresses to physical addresses of devices. Embodiments aggregate this information and feed it into a machine-learning model to train the model to predict whether the behavior is anomalous. In this way, embodiments of the present application determine whether a device is experiencing potentially malicious behavior based on the device's lack of reporting combined with analysis of behavioral information reported by the device's neighbors. Advantageously, by analyzing behavioral information of a device as reported by multiple neighboring devices as opposed to solely relying on behavioral information reported directly from the device, embodiments detect when a device may be the victim of malicious activity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
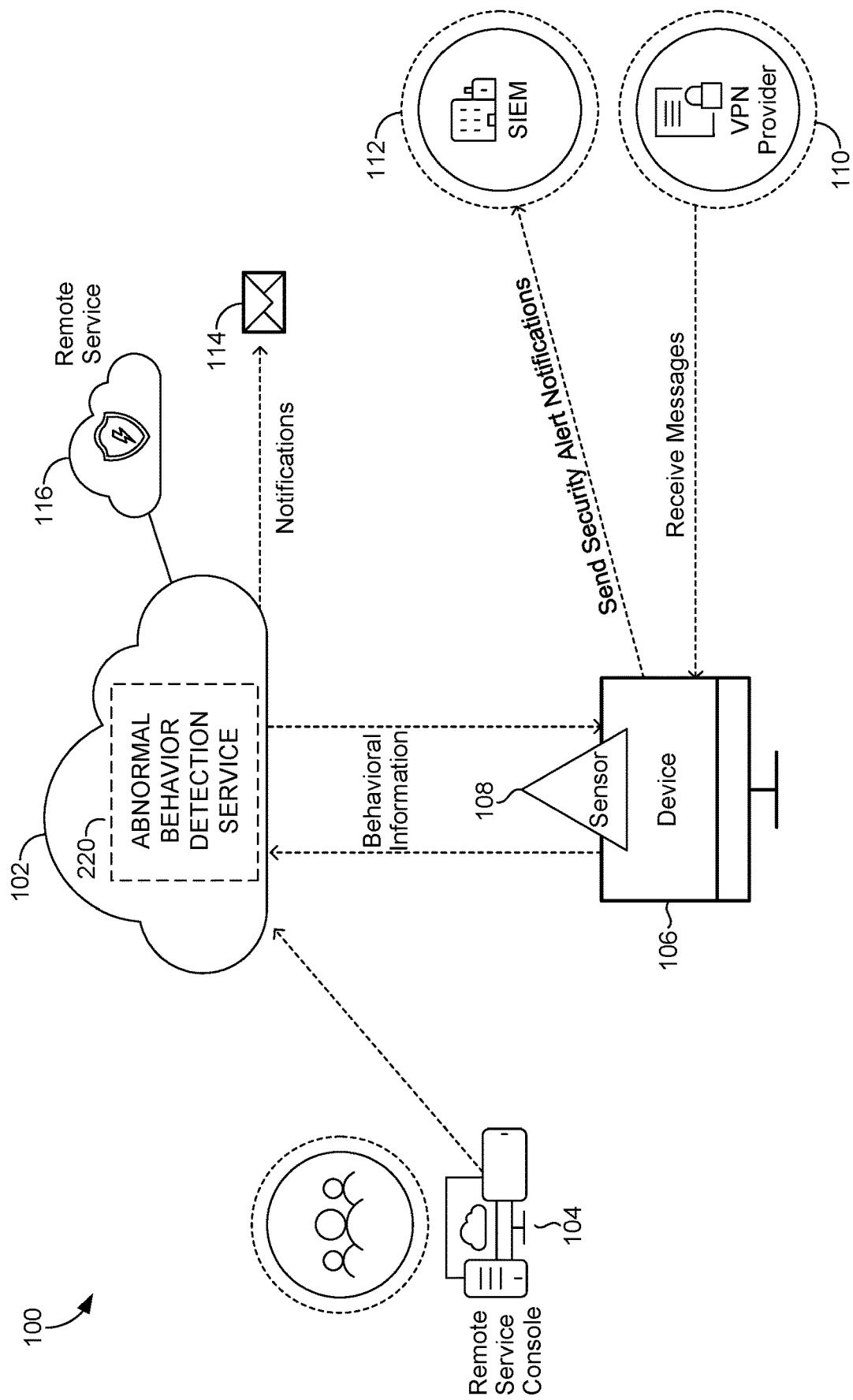
FIG. 1 is a block diagram of an example cloud-based service environment, suitable for use in implementing aspects of the technology described herein.

Overview of Technical Problems, Technical Solutions, and Technological Improvements Generally, companies conduct continuous analysis on device and software behavior within an enterprise to ensure all devices and operations are running properly. In some instances, this analysis provides an enterprise and information security team critical information that may thwart potentially malicious tasks. To gain these insights, analysis is typically done by reviewing certain telemetry data and information derived or created from the devices and its software. For example, enterprise and information security teams may monitor a computing device and its software's behavior by observing reporting data to ensure a device is alive and reporting. When a device or its software becomes dysfunctional or stops reporting due to a hardware or software failure, there is a gap in the information that can be observed and reviewed to determine the source of the abnormal behavior. As such, traditional review of device reporting data is limited by the amount of information reported by the device itself and its software.

This conventional monitoring process is prone to error when a device and its client-side software (including software agents that are typically employed to ensure proper operation and running) are alive but otherwise no longer reporting information such as their status and health. Devices and their client-side software may become dysfunctional for numerous reasons. For example, devices and software may suffer technical or hardware failures, the software may be misconfigured, and malicious actors may tamper with the software, among many other reasons. Thus, if software stops working but the device is alive and connected to the internet, conventional methods have no way of determining whether the root cause of the issue is malicious or not due to a lack of reporting information.

In particular, when a computing device or the device's software experiences technical issues or problems, the device and/or its software may be unable to transmit information due to the technical issues. For example, a device that is shut down or disconnected from a network will not be able to report information regarding its own health or status. As such, the conventional approaches for identifying abnormal or potentially harmful behavior of a device and/or its software within an enterprise network remain deficient because a device cannot report its own hardware or software failures until the problem is resolved.

Embodiments of the present disclosure mitigate these and other problems and are directed to improved methods, systems, and computer storage media for detecting abnormal behavior of a computing device based on an analysis of behavioral information of the device's neighbors in a computing environment (e.g., enterprise network, a distributed computing environment, or similar configuration). For example, some embodiments determine whether a device is failing, being tampered with, or exhibiting abnormal behavior when the device has stopped reporting behavioral information, yet the device is still active in the enterprise network based at least in part on behavioral information associated with the device reported by neighboring devices. Further, some embodiments can distinguish between malicious abnormal behavior and non-malicious abnormal behavior by using anomaly detection logic, which may comprise a machine-learning model trained on specific information about the device, the device's behavior, or other information about the network environment. For example, in some of these embodiments, the model (or anomaly detection logic) is trained on data corresponding to various types of anomalies, and utilized to score behavioral information received from multiple neighboring devices. In some instances, the training data may comprise labeled training data derived from previous, historical incidents or simulated incidents. Based on the abnormality score(s) determined utilizing the anomaly detection logic, it may be determined whether reported behavioral information of a device is potentially indicative of malicious activity or benign abnormal operating behavior. In some embodiments, the anomaly detection logic is further trained or configured for detecting information about the device dysfunction, such as whether the cause is likely malicious or benign or information indicating the type of dysfunction or related to a potential cause of the dysfunction.

According to one embodiment, a dysfunctional device detector of an abnormal behavior detection system in the computing environment can identify abnormal behavior with an enterprise network by analyzing behavioral information of multiple neighboring devices and, using a trained machine-learning model, score the behavioral information to determine whether the score exceeds an anomaly threshold. In this manner or similar manners, embodiments of the present disclosure employ a "hive-mind" or collective-intelligence approach to determine anomalous behavior of a device in a network based on analyzing behavior information reported by neighboring devices within the network. Accordingly, embodiments utilizing a trained machine-learning model(s) are able to learn and distinguish normal reporting patterns of devices within a network from abnormal activity, which enables the trained machine-learning model to efficiently and accurately predict when a device is dysfunctional or exhibiting abnormal behavior, and in some embodiments further determine whether the dysfunction is likely malicious or benign.

In some embodiments, a device may comprise a computing device, which may be physical or a virtual machine (e.g., a virtual computer operating in software), a software agent or computing program operating on at least one computing device, or a system component of a computing device, which may be part of a network of other devices. According to embodiments described herein, a dysfunctional device detector of an abnormal behavior detection system in the computing environment can identify abnormal behavior within a computing environment (e.g., an enterprise network) by analyzing behavioral information of a dysfunctional device through analysis of behavioral information reported by the dysfunctional device's neighbor devices. Using anomaly detection logic, such as a trained machine-learning model, the behavioral information may be processed to determine an abnormality score that may be compared against an anomaly threshold. Where the determined abnormality score exceeds the anomaly threshold, then it may be inferred that the dysfunctional device may be behaving abnormally and potentially suffering from malicious activity.

In particular, embodiments of the present disclosure employ a hive-mind or collective-intelligence approach to determine anomalous behavior of a device in a network based on analyzing behavior information reported by at least one neighboring device within the network. Neighboring devices may comprise any devices operating in the computing environment, such as devices in a network or a portion of the network (e.g., network segment). By identifying abnormal behavior of a particular device based on the reporting information of neighboring devices, embodiments of the present disclosure are able to determine whether the device is alive and healthy even when the device is unable to communicate to report its own information.

Generally, embodiments of the present disclosure employ a hive-mind or collective-intelligence technique to identify abnormal behavior of a particular device and/or its software. To enable analysis of behavior information of a device or neighboring device, embodiments may employ a computer program routine operating on or in connection with a device to facilitate monitoring the device and/or at least one of its neighboring devices. For example, the computer program routine may comprise a software agent operating on (or in connection with) each device, which may receive reporting information about each device and/or at least a portion of neighboring devices. Some embodiments may receive information regarding whether one or more neighboring devices are alive and reporting. For instance, these embodiments receive health information and/or observation data (i.e., behavioral information) from one or more neighboring devices connected to a network segment. Embodiments may then aggregate the behavioral information received from the one or more neighboring devices and may further index the information to associate observation data of the neighboring devices (e.g., device information such as MAC addresses or device names) with health information of those devices. Based on behavioral information reported from the one or a plurality of neighbor devices, these embodiments can determine whether the particular device is still alive, active, and reporting.

According to some embodiments, to identify behavioral information reported by multiple neighboring devices, a device connected via a network segment (i.e., neighboring devices) is equipped with a computer program, such as a software agent, that frequently reports behavioral information to a cloud service. For example, the software agent may be operate on or in connection with the device, and may report a list of MAC addresses of other devices in a local network using the Address Resolution Protocol (ARP) active on all Microsoft® Windows devices and used for mapping a network address (e.g., IPv4 address), to a physical address, such as a MAC address. Additionally, in some embodiments, the software agent may use reverse DNS resolution (rDNS) to report computer names of a neighbor observed using ARP. In this manner, these embodiments can aggregate the behavioral information reported by one or multiple neighboring devices by correlating MAC addresses and computer names with software agent ID numbers to determine whether a particular device is alive and active in the network.

Once these embodiments identify that a particular device has stopped reporting (i.e., inactive device), embodiments determine that the device is behaving abnormally based on analyzing the aggregated behavioral information. In some embodiments, anomaly detection logic is applied to the aggregated behavioral information. For instance, the behavioral information of the inactive device can be input into a machine-learning model trained on data corresponding to various types of anomalies. These embodiments employ the machine-learning model to score the behavioral information of the inactive device based on the reported behavioral information of the device from one or more of the device's neighboring devices within a network. This abnormality score may be utilized as a prediction of the likelihood that a particular device is acting abnormally. For example, if a device is not reporting for N units of time, while observed by M neighbors in the network, this may be indicative of abnormal behavior. Accordingly some embodiments can determine whether the abnormality score generated by the machine-learning model (or anomaly detection logic) satisfies an anomaly threshold, and if so, may initiate a security mitigation action (e.g., sending an email to relevant email address, generating an alert in a management console, or providing a notification) based on whether the score exceeds the threshold.

Advantageously, embodiments of the present disclosure can efficiently identify and investigate abnormal device behavior within a computing environment, such as an enterprise network, even when a device stops reporting its own information. By analyzing health information and observation data that includes information from one or more neighboring devices in the computing environment, embodiments of the present disclosure can rely on reporting information from those neighboring devices so that if a particular device is alive but not reporting information, these embodiments can determine whether the reporting failure is due to potentially malicious activity on the particular device. In other words, these embodiments of the present disclosure may efficiently analyze information from multiple neighboring devices within a network to determine whether a particular device is operating abnormally when that device is no longer reporting information.

Having briefly described an overview of aspects of the present disclosure, various terms used throughout this description are provided. Although more details regarding various terms are provided throughout this description, general descriptions of some terms are included below to provide a clear understanding of ideas disclosed herein.

Behavioral information generally refers to computing-device behavior or activity, which may include any information that indicates the health or status of a computing device and its software. For example, battery health, network connection status, metadata, statistical data about the telemetry of the device or its software (e.g., device A received 20 MBs of information from device B at time X), cloud configuration status, etc. Behavioral information may be comprised of health information of a device and its software and/or observation data of a device from other neighboring devices connected within a network segment. For example, behavioral information may be generated by a software agent on a device. As another example, behavioral information may be comprised of telemetry data of a software agent and the network status of a software agent's underlying system as reported by other software agents in a network.

An abnormality score generally refers to a score or probability associated with behavioral information that is indicative of a likelihood of abnormal activity. As used herein, an abnormality score may be determined based on attributes, factors, features, or the like of the behavioral information that indicate or provide indications that device behavior is abnormal. For example, embodiments of the present disclosure may calculate an abnormality score based on anomaly detection logic, which may include heuristics, rules, expert knowledge encodings, machine learning methods and models, a combination of these methods, and/or other methods used for abnormality detection.

Overview of Example Environments for Detecting Abnormal Device Behaviors

Aspects of the technical solution can be described by way of examples and with reference to FIG. 1 and additional illustrations below. FIG. 1 illustrates a block diagram of an example cloud-based service environment suitable for use in implementing embodiments of the present disclosure. Generally, environment 100 is suitable for identifying potentially abnormal behaviors within a computing environment (e.g., enterprise network, a distributed computing environment, etc.) by analyzing behavioral information among neighboring devices in a computing environment. It should be understood that this and other arrangements described herein are set forth only as examples. Other arrangements and elements (e.g., devices, machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 100 shown in FIG. 1 is an example of one suitable operating environment. Cloud-based service environment generally contains cloud-based service 102 (e.g., Microsoft® Advanced Threat Protection (ATP)) which contains abnormal behavior detection service 220. At a high level, cloud-based service 102 monitors client device 106 by capturing and parsing information such as behavioral information from the device. Cloud-based service 102 may analyze the received data to perform operations such as threat and abnormal behavior detection. For example, abnormal behavior detection service 220 residing in cloud-based service 102 may employ anomaly detection logic, such as a trained machine-learning model, to identify abnormal behavior of a device based on analyzing reporting information from multiple neighboring devices within an enterprise network.

As shown, cloud-based service 102 may be connected to a remote service console 104 (e.g., Microsoft® Azure ATP Portal) that enables monitoring, management, and investigation of data captured by cloud-based service 102. For example, remote service console 104 allows integration of cloud-based service 102 with other services, management of configuration setting for sensor 108, viewing data received from cloud-based service 102, and enabling monitoring of detected abnormal activities and suspected attacks based on an attack kill chain model.

To assist in the collection of information from client device 106, sensor 108 may be installed directly on client device 106 to perform operations such as collecting behavioral information (e.g., health information and observation data), monitoring device traffic, gathering telemetry data of a software agent, collecting network status information, or gathering other information. For example, sensor 108 may be a software agent installed on device 106 that reads and/or collects behavioral information, without requiring additional hardware or configurations. Although not shown for clarity, sensor 108 also supports communication with other sensors on other devices, which enables sensor 108 and the other sensors to collect data from multiple devices including device 106 that are connected via a network segment.

Client device 106 may communicate information with security information and event management entity 112. Security information and event management entity 112 may perform such functions such as providing real-time analysis of security alerts generated by applications and enterprise hardware such as client device 106. Additionally, client device 106 may receive messages from VPN provider 110. For example, client device 106 may receive behavioral information such as information about a user's login session. These messages may be sent when a user (including a remote user) logs into a VPN and logs off. Alternatively, these messages may be sent periodically during a user's session.

Cloud-based service 102 may send notifications 114 to multiple entities or users. For example, notification 114 may be an email to a security analyst of an enterprise security team providing information analyzed by abnormal behavior detection service 220. Alternatively, behavioral information in notification 114 may also be viewed by remote service console 104. As such, cloud-based service 102 can notify multiple entities or individuals at a single time to convey analyzed information such as abnormal device behavior detected by abnormal behavior detection service 220.

Additionally, cloud-based service 102 may be connected to remote service 116. As shown, remote service 116 may be cloud-based and may receive information from cloud-based service 102 and send information to cloud-based service 102. Alternatively, remote service 116 may be a standalone platform. For example, remote service 116 may deploy Microsoft® Defender Advanced Threat Protection (ATP) designed to enable enterprises to prevent, detect, investigate, and respond to advanced threats. As such, remote service 116 may use information gathered by cloud-based service 102 to perform endpoint behavioral analysis, perform cloud security analytics, and analyze other threat intelligence. For example, sensors may be utilized by remote service 116 to collect and process behavioral signals from the operating system of a computer or other device. As another example, remote service 116 may leverage intelligence and other data generated by hunters, security teams, and other individuals or entities to enable identification of attacker tools, techniques, and procedures, and generate alerts when these are observed. In embodiments, abnormal behavior detection service 220 may utilize information gathered by remote service 116. In other embodiments, abnormal behavior detection service 220 may utilize a combination of information gathered, collected, or analyzed by remote service 116 and information (e.g., behavioral information) gathered from sensor 108 on client device 106.

Figure 2:
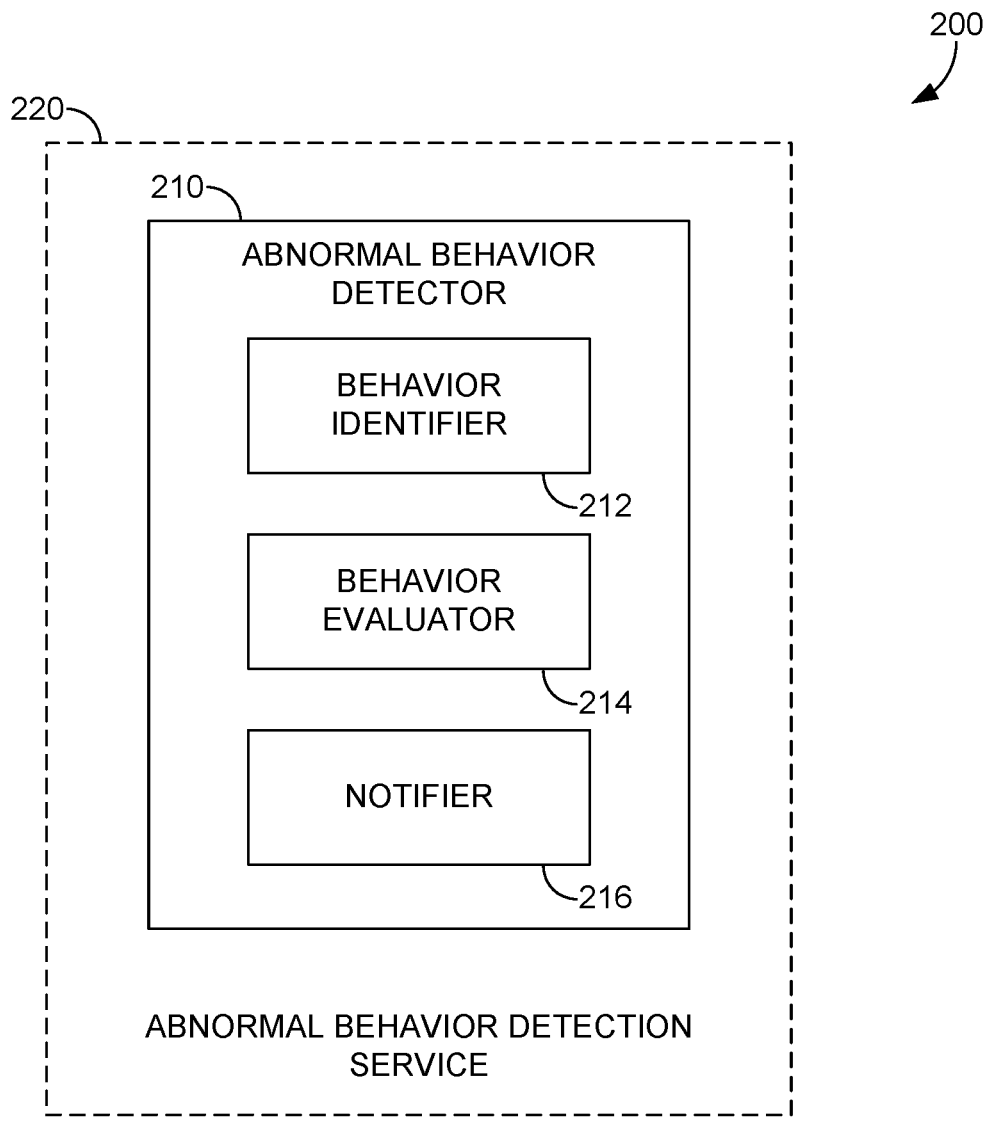
FIG. 2 is a block diagram of an example dysfunctional device detection architecture for detecting abnormal behavior among multiple devices in a network using a dysfunctional device detector, suitable for use in implementing aspects of the technology described herein.

Referring to FIG. 2, a block diagram is provided showing an exemplary technical solution architecture (abnormal behavior detection architecture 200) suitable for use in implementing embodiments of the technical solution. Generally, the technical solution architecture includes a technical solution system suitable for providing an abnormal behavior detection service based on an abnormal behavior detector. As shown, FIG. 2 discloses an abnormal behavior detection architecture 200, abnormal behavior detection service 220, and abnormal behavior detector 210 having behavior identifier 212, a behavior evaluator 214, and notifier 216.

In embodiments, abnormal behavior detection service 220 may be deployed in cloud-based service 102 as discussed in conjunction with at least FIG. 1. Alternatively, abnormal behavior detection service 220 may be implemented into any suitable computing device or computing environment such as client device 680 described in conjunction with at least FIG. 6 and computing device 700 described in conjunction with at least FIG. 7. In embodiments, abnormal behavior detection service 220 contains an abnormal behavior detector 210 utilized to identify abnormal device behavior within an enterprise network that may correspond to malware on the device or an attacker within the enterprise. Although not shown for clarity, abnormal behavior detector 210 can store or access computer instructions (e.g., software program instructions, routines, or services), data, logic, and/or models used in embodiments described herein.

As an overview, abnormal behavior detector 210 utilizes components 212, 214, and/or 216 and/or a combination thereof to implement the method described below in conjunction with at least FIGS. 3-6. Behavior identifier 212 aggregates health information and observation data (i.e., behavioral information) received from multiple neighboring devices within an enterprise network segment. In this manner, embodiments receive behavioral information from a device that is comprised of behavioral information of the device itself and behavioral information of other neighboring devices connected to the device within the network segment.

In embodiments, behavior evaluator 214 may analyze the aggregated behavioral information of one or more neighboring devices to generate an abnormality score for a dysfunctional device that has stopped reporting behavioral information. Behavior evaluator 214 may utilize anomaly detection logic to evaluate the aggregated behavioral information, including information received from neighboring devices, and determine an abnormality score. For example, using a machine-learning model trained on data corresponding to various types of anomalies, embodiments generate an abnormality score for aggregated behavioral information received from the neighboring devices. Given the observation data and health information reported by a device's neighbors, behavior evaluator 214 employs a trained machine-learning model to generate an abnormality score for a dysfunctional device (e.g., a device that has stopped reporting behavioral information to abnormal behavior detection service 220. A high abnormality score indicates a higher likelihood that the dysfunctional device is suffering hardware failure, has a software bug, is being attacked, or experiencing some other potentially malicious activity. In embodiments, notifier 216 may then communicate the abnormality score and/or cause a security mitigation action such as generating an alert, or isolating neighboring devices from a dysfunctional device with a high abnormality score.

In this way, to initiate aggregating behavioral information received from multiple neighboring devices within an enterprise network segment, behavior identifier 212 identifies a device within a network segment that has stopped reporting behavioral information. For example, behavior identifier 212 may analyze behavioral information for each device that is observed within a network segment but is failing to report behavioral information. That is, these embodiments identify that the device is alive and connected within the network because one or more neighboring devices are reporting behavioral information from the device; however, the device is dysfunctional and failing to report its own information. As such, behavior identifier 212 is able to aggregate behavioral information related to a dysfunctional device by analyzing information from neighboring devices of the dysfunctional device.

As contemplated in the present disclosure, embodiments leverage the Address Resolution Protocol (ARP) present on a device (e.g., device running a Windows® operating system) to map a network address (e.g., IPv4 address) to a physical address (e.g., MAC address) of the device. In this way, embodiments may employ a software agent on each device within a network to receive behavioral information of multiple neighboring devices that are active and reporting within the network. In other words, the software agent installed on each device reports lists of MAC addresses of all devices it observes in a network using the ARP data. Additionally, in some embodiments, the software agent may use reverse DNS resolution (rDNS) to report computer names of its neighbors observed using ARP. Embodiments aggregate the behavioral information reported by multiple neighboring devices by correlating MAC addresses and computer names with software agent ID numbers to determine whether a device is alive and active in the network. As a result, embodiments determine whether software agents on a device are failing or being tampered with based on the fact that the device has stopped reporting behavioral information, yet the device is still active in the network because the device's neighbors are reporting behavioral information associated with the device.

Behavior evaluator 214 of abnormal behaviors detector 210 is generally configured to analyze the aggregated behavioral information of multiple neighboring devices using anomaly detection logic, such as a trained machine-learning model, to generate an abnormality score for a device that has stopped reporting behavioral information described in more detail below in conjunction with at least FIGS. 3 and 4. In embodiments, behavior evaluator 214 initially indexes behavioral information received from multiple neighboring devices such that the reporting information gathered about each neighboring device is associated with the correct device. In some embodiments, MAC addresses and device names are correlated or associated with IDs of each device's software agent such that embodiments can analyze the associations to determine whether a device in the network is inactive and stopped reporting behavioral information.

According to some embodiments, once it is determined that a particular device has stopped reporting (i.e., inactive device) based on analyzing the aggregated behavioral information, anomaly detection logic may be applied to behavioral information of the inactive device. For instance, in an embodiment this behavioral information is input into a trained machine-learning model. Embodiments employ the anomaly detection logic to score the behavioral information of the inactive device based at least in part on the reported behavioral information of the device from the device's neighboring devices within a network. In some instances, the abnormality score represents a prediction of the likelihood that a device is acting abnormally. For example, if a device is not reporting for N units of time, while observed by M neighbors in the network, this may be indicative of abnormal behavior. As a result, behavior evaluator 214 may determine whether the abnormality score generated by the anomaly detection logic passes an anomaly threshold indicative of abnormal or potentially malicious activity on a device. In some embodiments, the anomaly threshold may be predefined, determined based on characteristics of the computing environment or potentially anomalous device, or may be dynamic, adaptive, or conditional. For instance the anomaly threshold may be based on computer network conditions or previous rates of detected anomalous behavior, for example. Similarly, a threshold that is adaptive may increase where there is occurring an increased level of benign abnormal activity, such as a problematic upgrade of multiple devices that causes the multiple devices to dysfunction.

Notifier 216 of abnormal behavior detector 210 is generally configured to cause a security mitigation action based on whether the abnormality score exceeds the predefined anomaly threshold. For example, although not shown for clarity, it is contemplated that notifier 216 may perform any suitable security mitigation action such as sending an email to a relevant email address of an enterprise security team member, generating an alert in a management console for an enterprise security team member to view, and isolating neighboring devices from a dysfunctional device in a network, among others. Alternatively, if the abnormality score does not exceed a predefined anomaly threshold, notifier 216 may take no action or still generate an alert for an enterprise security team member to view the score. Additionally, it is contemplated that the predefined anomaly threshold may be set or change dynamically based on input from a user or based on previously observed behavioral information in the network. As such, notifier 216 supplements or aids embodiments to produce, generate, or cause a security mitigation action that may be used to combat the abnormal behavior of a device within a network.

Example Methods for Abnormal Behavior Detection

With reference to FIGS. 3-6, flow diagrams and example graphs are provided illustrating methods for detecting abnormal behavior of a device in an enterprise network based on an analysis of behavioral information of the device's neighbors in a computing environment (e.g., enterprise network, a distributed computing environment, etc.). The methods may be performed using the abnormal behavior detection environment described herein. In embodiments, one or more computer storage media having computer-executable instructions embodied thereon that, when executed, by one or more processors can cause the one or more processors to perform the methods in the storage system.

Figure 3:
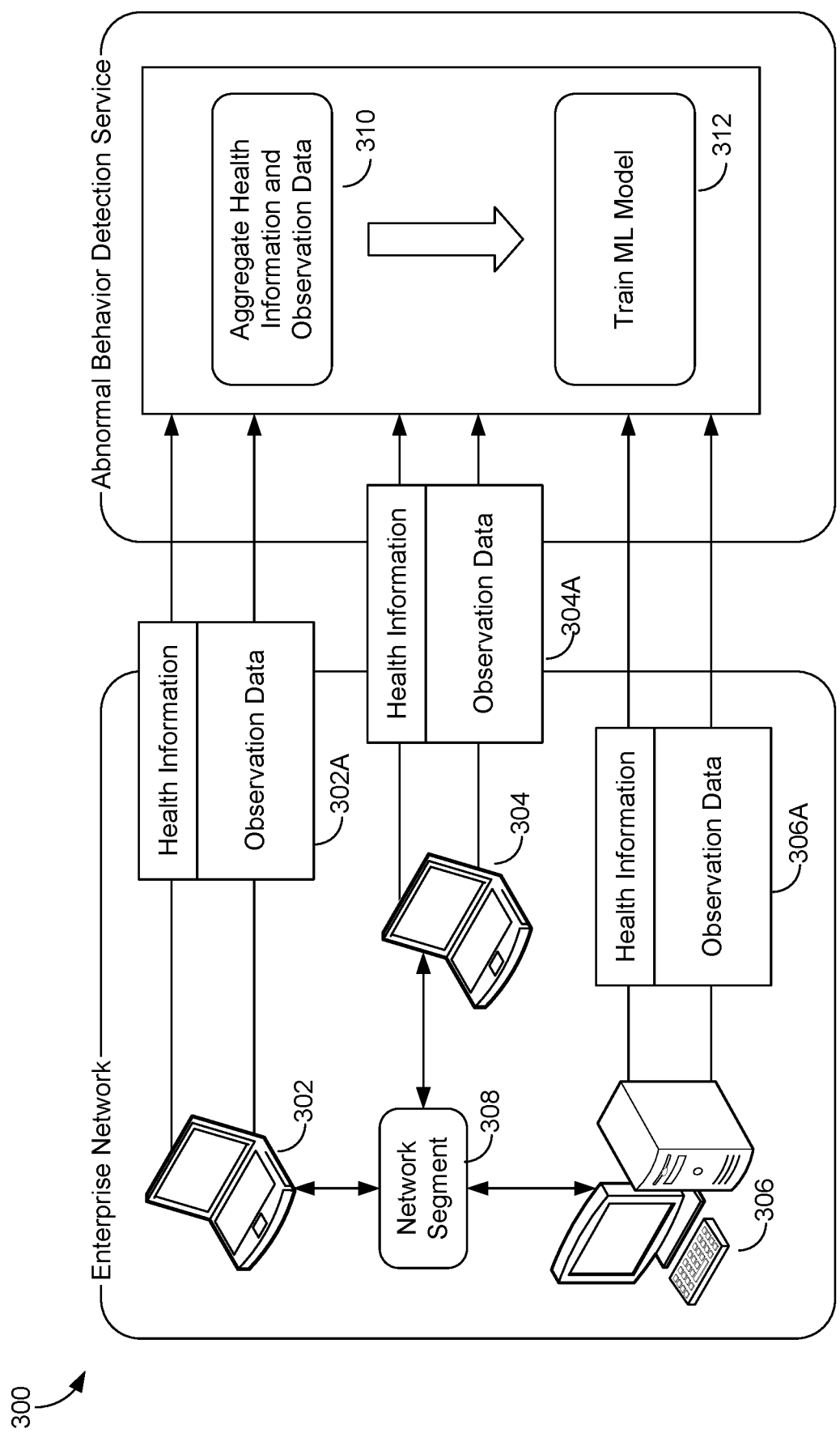
FIG. 3 is a flow diagram providing an example method of training a machine-learning model to predict dysfunctional device behavior, in accordance with aspects of the technology described herein.

Turning to FIG. 3, a flow diagram is provided that illustrates a method 300 for training a machine-learning model to predict dysfunctional device behavior. Generally, the flow diagram of FIG. 3 can be implemented using the architecture described above at least in conjunction with FIGS. 1 and 2. For example, any suitable combination of portions of method 300 may be implemented into various components of abnormal behavior detector 210 such that abnormal device behavior within an enterprise network is identified by analyzing behavioral information of a dysfunctional device through analysis of behavioral information reported by the dysfunctional device's neighbors and, using a trained machine-learning model or other anomaly detection logic, scoring the behavioral information to determine whether the score exceeds an anomaly threshold.

Initially, method 300 shows devices 302, 304, and 306 connected to each other via network segment 308. In this way, the abnormal behavior detection service is able to receive health information and observation data (i.e., behavioral information) regarding each device connected to network segment 308 (i.e., neighboring devices). Abnormal detection service receives health information and observation data from each of devices 302, 304, and 306 (i.e., behavioral information from block 302A, 304A, and 306A). Health information may include, but is not limited to, any information indicative of the health of the device or its software. For example, health information may be a "keepalive beacon" indicating that the device is alive and reporting information. Observation data may include, but is not limited to, any information regarding the activity or status of other devices connected via a network segment. For example, observation data may include the MAC address and device name of other neighboring devices connected via a network segment.

Advantageously, observation data reported by a device includes data about other neighboring devices connected via a network segment. As a further example, observation data in block 302A may include information regarding the health status and activity data/information of devices 304 and 306.

In this manner, if a device such as device 302, 304, or 306 suffers a hardware or software failure or otherwise becomes dysfunctional but is still alive and connected to network segment 308, one of the device's neighbors will be able to report information to the abnormal behavior detection service regarding the dysfunctional device. Although not shown for clarity, it is contemplated that any number of devices may be connected via a network segment such that health information and observation data can be analyzed and aggregated by abnormal behavior detection service.

At block 310, abnormal device detection service aggregates the health information and observation data reported by each device 302, 304, and 306 connected via network segment 308. As mentioned above, embodiments initiate aggregating behavioral information received from one or more neighboring devices (e.g., devices 302, 304, and 306) within enterprise network segment 308. Embodiments leverage the Address Resolution Protocol (ARP) present on a device (e.g., devices 302, 304, and 306 which are running a Windows® operating system) to map a network address (e.g., IPv4 address) to a physical address (e.g., MAC address) of the device. In this way, some embodiments may employ a computer program, such as a software agent, operating on or in connection with each device within a network to receive behavioral information of multiple neighboring devices that are active and reporting within the network. In other words, a software agent installed on each device 302, 304, and 306 reports lists of MAC addresses of all devices it observes in a network using the ARP data. Additionally, in some embodiments, the software agent may use reverse DNS resolution (rDNS) to report computer names of its neighbors observed using ARP. Some embodiments may also aggregate the behavioral information reported by multiple neighboring devices by correlating MAC addresses and device names with software agent ID numbers.

At block 312, embodiments may utilize the aggregated information to train a machine-learning model to predict a probability that a device, which is still alive and connected to a network but has stopped reporting information, is dysfunctional. As described herein, anomaly detection logic may comprise one or more machine-learning models trained to detect anomalous behavior or device dysfunction. It is contemplated that any suitable supervised machine-learning model or algorithm such as, but not limited to, a neural network, logistic regression, decision tree (which may comprise a decision tree ensemble or random forest), or a Naïve Bayes classifier, may be utilized by anomaly detection logic to determine likelihood of device dysfunction. Training data utilized in supervised learning to train the model(s) or logic may include labeled training data, which may be derived from previous, historical incidents or simulated incidents. As a result of having a trained machine-learning model, embodiments are able to learn the normal reporting patterns of devices within a network which enables the trained machine-learning model to efficiently and accurately predict when a device is dysfunctional or exhibiting abnormal behavior.

In some embodiments, the anomaly detection logic (or machine-learning model) may comprise a combination of models and/or a model and other logic, such as rules, conditions, or heuristics. For example, in an embodiment, an administrator may configure a pre-determined rule, included in the anomaly detection logic, indicating benign or malicious behavior, such as a specific feature value of the behavioral, device, or network environment information. In an embodiment, heuristics, rules, or other logic may be learned, automatically set, or configured, from historic data such as past incidents of detected malicious or benign activity (e.g., a malware attack or hacking event representing malicious activity, or a system upgrade representing benign activity). In some embodiments where multiple models or aspects of logic are utilized, an ensemble or cumulative sum may be employed to generate the abnormality score, which may comprise a composite of component abnormality scores from the sum or ensemble. In some embodiments, anomaly detection logic may be trained or configured for detecting dysfunction and/or determining information about the dysfunction, such as whether it is malicious or benign, or in some instances further determining the type of dysfunction or information related to a potential cause of the dysfunction.

Figure 4:
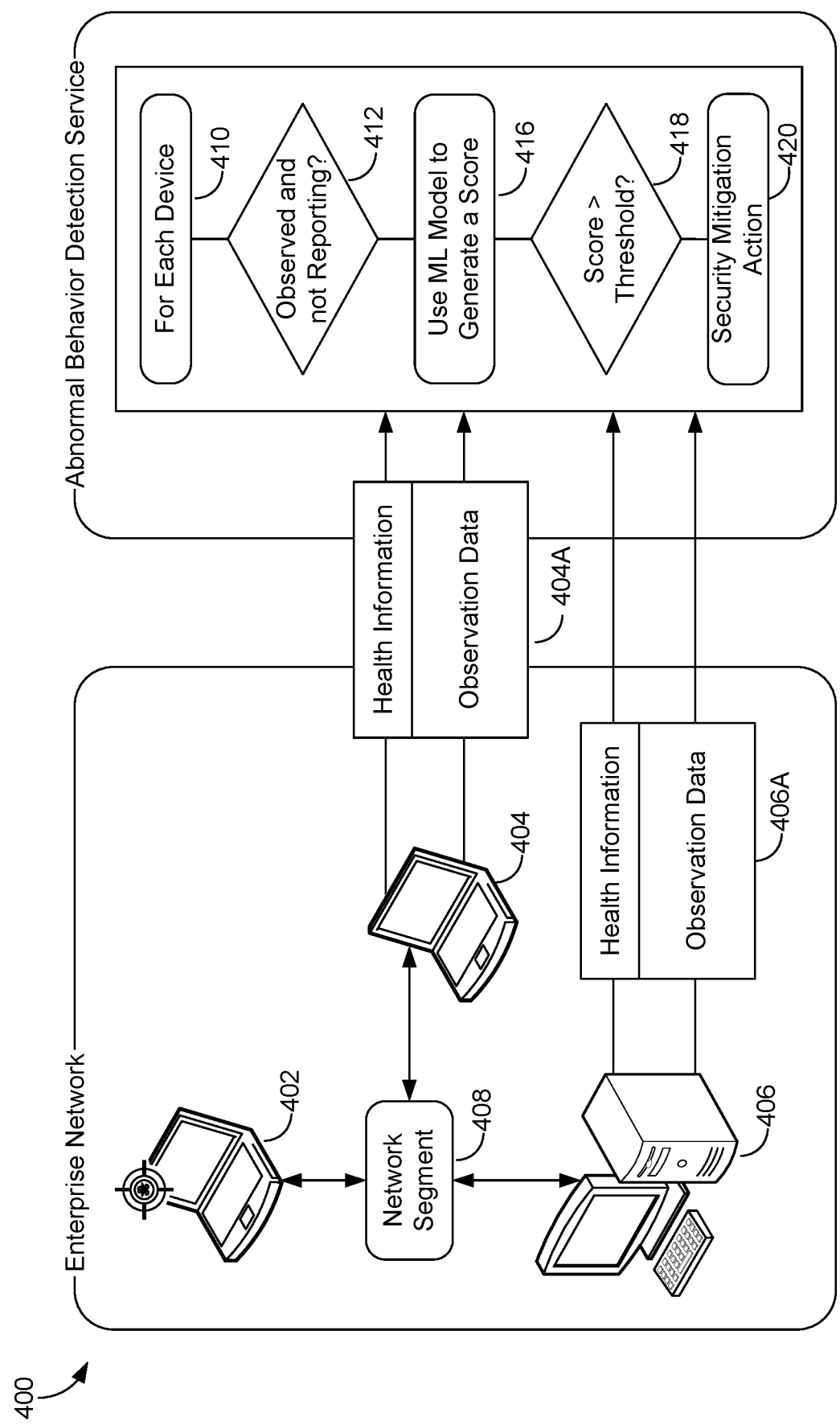
FIG. 4 is a flow diagram providing a first example method of detecting dysfunctional device behavior among multiple devices in a network, in accordance with aspects of the technology described herein.

Referring now to FIG. 4, FIG. 4 shows a flow diagram providing an example method of detecting dysfunctional device behavior among multiple devices in a network, in accordance with aspects of the technology described herein. Generally, the flow diagram of FIG. 4 can be implemented using the architecture described above at least in conjunction with FIGS. 1 and 2. For example, any suitable combination of portions of method 400 may be implemented into various components of abnormal behavior detector 210 such that abnormal device behavior within an enterprise network is identified by analyzing behavioral information of a dysfunctional device through analysis of behavioral information reported by the dysfunctional device's neighbors and, using a trained machine-learning model, scoring the behavioral information to determine whether the score exceeds an anomaly threshold.

Initially, method 400 shows devices 402, 404, and 406 connected to each other via network segment 408. In this way, the abnormal behavior detection service is able to receive health information and observation data (i.e., behavioral information) regarding each device connected to network segment 408 (i.e., neighboring devices). As shown, abnormal detection service receives health information and observation data from each of devices 404 and 406 (i.e., behavioral information from block 404A and 406A) but not from device 402. As a result, at block 410, for each device 404 and 406 embodiments aggregate the behavioral information reported by each device in the network. At block 412, embodiments determine whether any of devices 402, 404, and 406 are observed within the network but not reporting information based on the behavioral information collected and analyzed from devices connected to network segment 408. For example, embodiments may determine that device 402 is not reporting information but is still alive and connected to the network based on the reported behavioral information of devices 404 and 406 (i.e., behavioral information 404A and 406A). Advantageously, embodiments are able to determine that device 402 is behaving abnormally based on the behavioral reporting information of device 402's neighbors (e.g., devices 404 and 406).

At block 416, embodiments use a trained machine-learning model to generate an abnormality score for the behavioral information associated with inactive device 402 as reported by its neighbors (devices 404 and 406). Based on the generated abnormality score, at block 418 embodiments determine whether the abnormality score exceeds an anomaly threshold. In some embodiments, the threshold may be predefined. In other embodiments, a user may choose the anomaly threshold based on the user's organizational needs and desire to adjust the sensitivity at which abnormal behavior is detected. Lastly, at block 420 embodiments cause a security mitigation action based on the abnormality score exceeding the anomaly threshold. A security mitigation action may include, but is not limited to, sending an email to a relevant email address of an enterprise security team member, generating an alert in a management console for an enterprise security team member to view, and isolating neighboring devices from a dysfunctional device in a network, among others.

Figure 5:
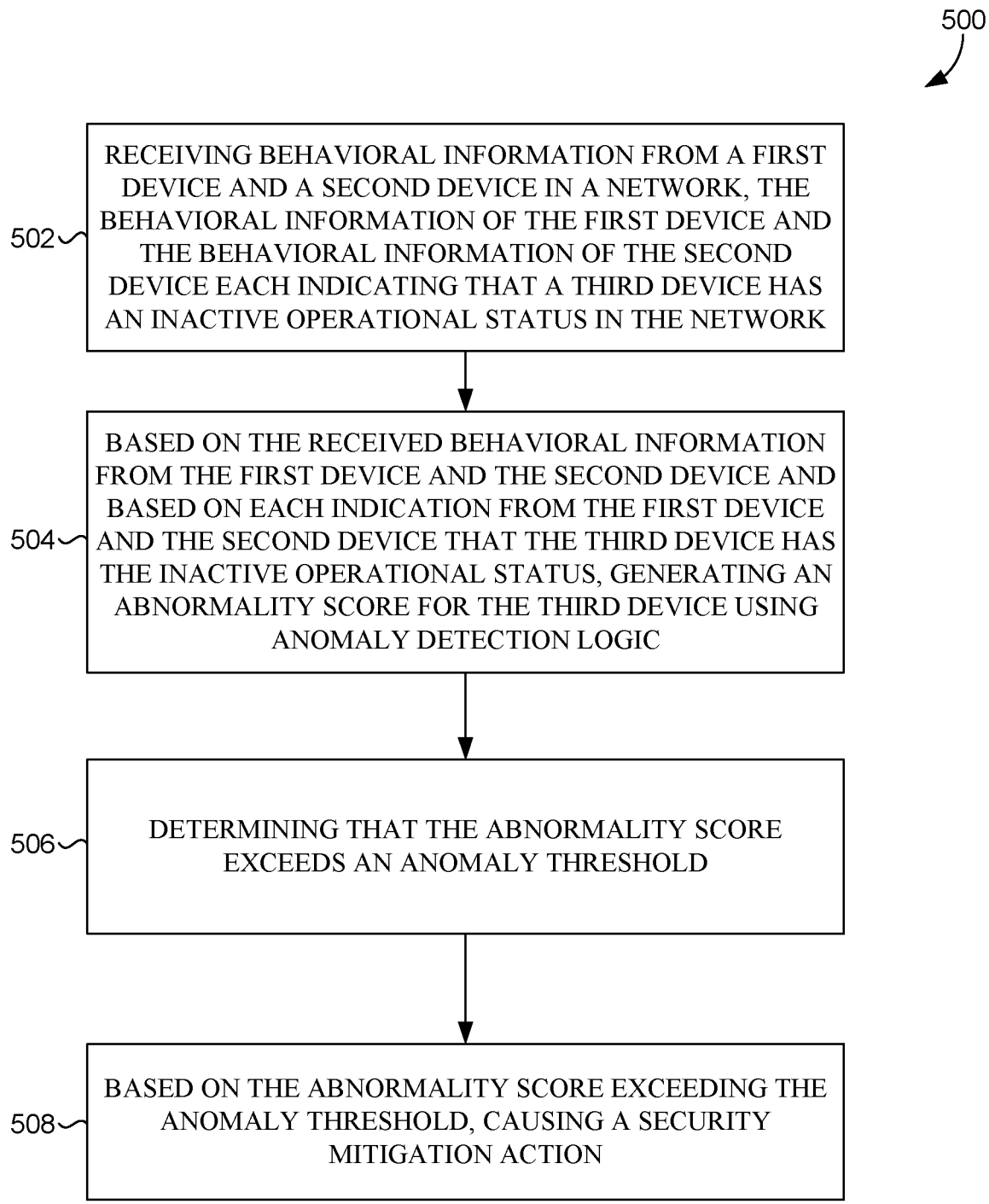
FIG. 5 is a flow diagram providing a second example method of detecting dysfunctional device behavior among multiple devices in a network, in accordance with aspects of the technology described herein.

Referring now to FIG. 5, FIG. 5 shows a flow diagram providing an example method of detecting dysfunctional device behavior among multiple devices in a network, in accordance with aspects of the technology described herein. Initially, at step 502, behavioral information is received from a first device and a second device in a network. Although not shown for clarity, in some embodiments, (1) the behavioral information from the first device includes (a) health information of the first device and (b) observation data of the second device and the third device, and (2) the behavioral information from the second device includes (a) health information of the second device and (b) observation data of the first device and the third device. The behavioral information of the first device and the behavioral information of the second device each indicating that a third device has an inactive operational status in the network. The health information comprises a keepalive beacon and observation data comprises MAC addresses and device names. In addition, the observation data of the first and second devices includes the operational status of third device in the network. Additionally, in some embodiments, behavioral information from the first and second devices is aggregated and health information and observation data of the first device are indexed with health information and observation data of the second device such that the operational status of the third device is determined based on the indexing. At step 504, based on determining that the third device has the inactive operational status based on the received behavioral information form the first device and the second device and base on each indication form the first device and the second device, an abnormality score is generated for the third device using detection logic. Although not shown for clarity, in some embodiments using anomaly detection logic comprises a trained machine-learning model. In addition, determining the inactive operational status of the third device comprises utilizing Address Resolution Protocol (ARP) to map a network address of the third device to a physical address of the third device, in some embodiments. At step 506, it is determined that the abnormality score exceeds an anomaly threshold. Lastly, at step 508, a security mitigation is caused based on the abnormality score exceeding the anomaly threshold. Although not shown for clarity, causing a security mitigation action further comprises at least one of isolating the third device from the network or generating a notification.

Example Distributed Computing Environment

Figure 6:
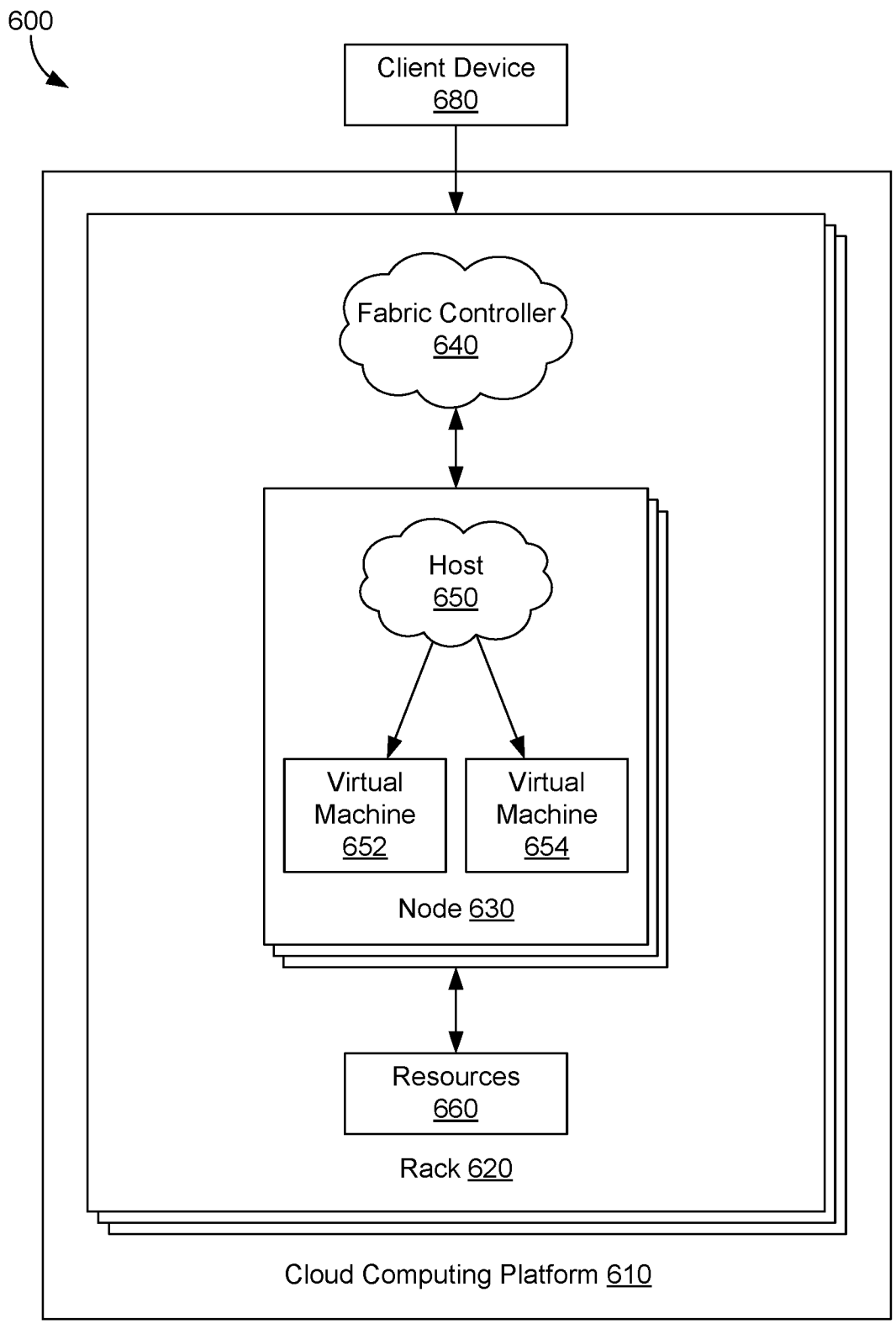
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high-level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., devices, machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines and devices can also concurrently run separate service applications. The virtual machines or physical machines and devices can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 700 described with reference to FIG. 7, for example, client device 700 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Operating Environment

Figure 7:
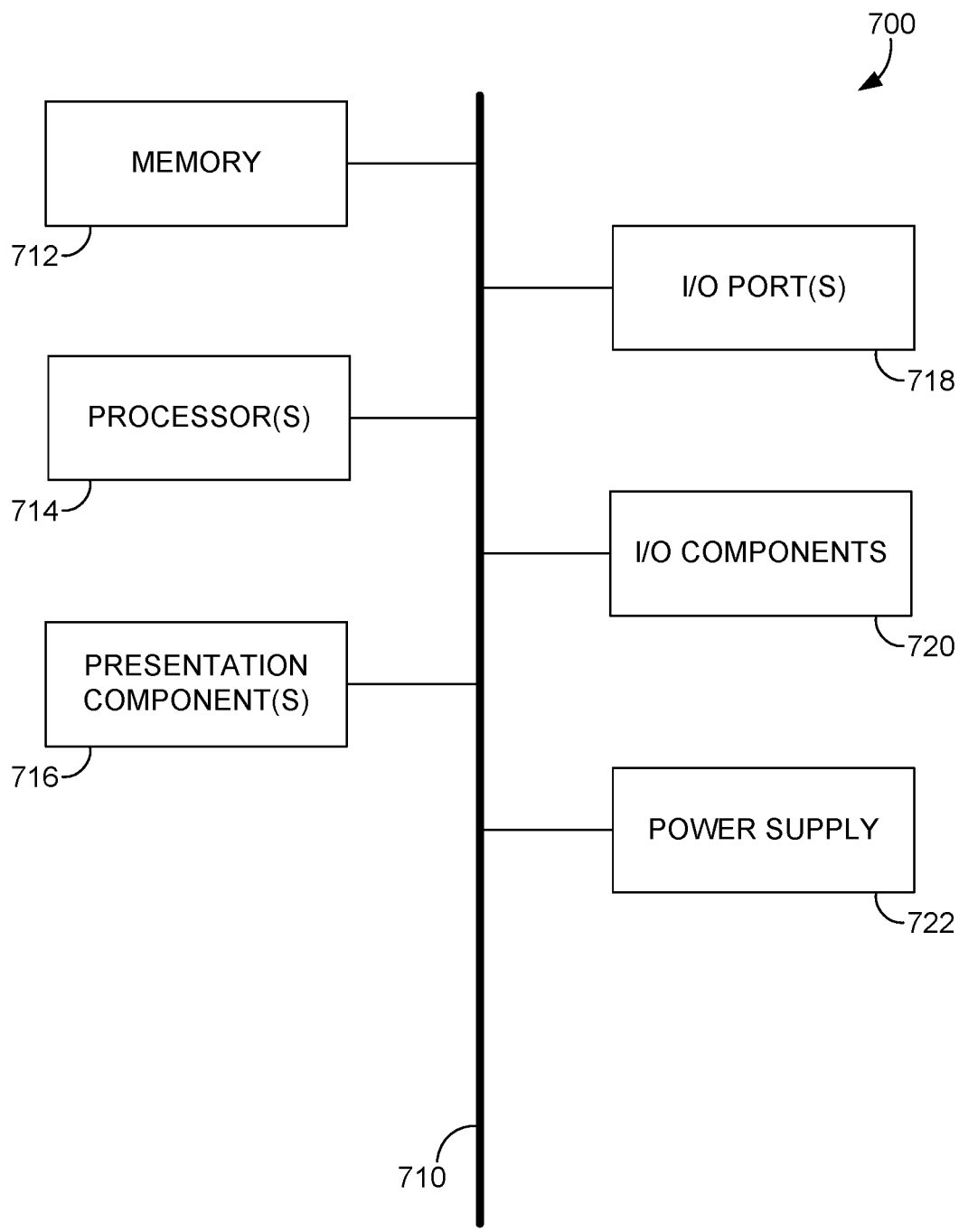
FIG. 7 is a block diagram of an exemplary computing environment suitable for use in implementing aspects of the technology described herein.

Having briefly described an overview of embodiments of the present disclosure, an example operating environment in which embodiments of the present disclosure may be implemented is described below in order to provide a general context for various aspects of the present disclosure. Referring initially to FIG. 7 in particular, an example operating environment for implementing embodiments of the present disclosure is shown and designated generally as computing device 700. Computing device 700 is but one example of a suitable computing environment and is not intended to suggest any limitation as to the scope of use or functionality of the disclosure. Neither should computing device 700 be interpreted as having any dependency or requirement relating to any one or combination of components illustrated.

The disclosure may be described in the general context of computer code or machine-useable instructions, including computer-executable instructions such as program modules, being executed by a computer or other machine or device, such as a personal data assistant or other handheld device. Generally, program modules including routines, programs, objects, components, data structures, etc. refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present disclosure.

By way of example, the technical solution system can include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

Embodiment 1

A computer-implemented method comprising receiving behavioral information from a first device and a second device in a network, the behavioral information of the first device and the behavioral information of the second device each indicating that a third device has an inactive operational status in the network; based on the received behavioral information from the first device and the second device and based on each indication from the first device and the second device that the third device has the inactive operational status, generating an abnormality score for the third device using anomaly detection logic; determining that the abnormality score exceeds an anomaly threshold; and based on the abnormality score exceeding the anomaly threshold, causing a security mitigation action.

Embodiment 2

The method of embodiment 1, wherein (1) the behavioral information from the first device includes (a) health information of the first device and (b) observation data of the second device and the third device, and (2) the behavioral information from the second device includes (a) health information of the second device and (b) observation data of the first device and the third device Embodiment 3

The method of any of embodiments 1-2, wherein the health information comprises a keepalive beacon and observation data comprises MAC addresses and device names.

Embodiment 4

The method of any of embodiments 1-3, wherein the observation data of the first and second devices includes the operational status of the third device in the network.

Embodiment 5

The method of any of embodiments 1-4, further comprising: aggregating the behavioral information from the first and second devices; and indexing health information and observation data of the first device with health information and observation data of the second device such that the operational status of the third device is determined based on the indexing.

Embodiment 6

The method of any of embodiments 1-5, wherein using anomaly detection logic comprises a trained machine-learning model.

Embodiment 7

The method of any or embodiments 1-6, wherein determining the inactive operational status of the third device comprises utilizing Address Resolution Protocol (ARP) to map a network address of the third device to a physical address of the third device.

Embodiment 8

The method of any of embodiments 1-7, wherein the first device includes a software agent utilizing reverse DNS resolution to report device names of the second and third devices based on utilizing the ARP.

Embodiment 9

The method of any of embodiments 1-8, wherein causing a security mitigation action further comprises at least one of isolating the third device from the network or generating a notification.

Embodiment 10

An abnormal computer behavior detection system comprising: a hardware processor; and computer-readable media having executable instructions embodied thereon, which, when executed by the hardware processor, cause the hardware processor to execute: an abnormal behavior detector configured to: receive behavioral information from a first device and a second device in a network, the behavioral information of the first device and the behavioral information of the second device each indicating that a third device has an inactive operational status in the network; based on receiving the behavioral information from the first device and the second device and based on each indication from the first device and the second device that the third device has the inactive operational status, generate an abnormality score for the third device using anomaly detection logic; determine that the abnormality score exceeds an anomaly threshold; and based on the abnormality score exceeding the anomaly threshold, cause a security mitigation action.

Embodiment 11

The system of embodiment 10, wherein (1) the behavioral information from the first device includes (a) health information of the first device and (b) observation data of the second device and the third device, and (2) the behavioral information from the second device includes (a) health information of the second device and (b) observation data of the first device and the third device.

Embodiment 12

The system of any of embodiments 10-11, further comprising: aggregating the behavioral information from the first and second devices; and indexing health information and observation data of the first device with health information and observation data of the second device such that the operational status of the third device is determined based on the indexing aggregating the behavioral information from the first and second devices

Embodiment 13

The system of any of embodiments 10-12, wherein using anomaly detection logic comprises a trained machine-learning model.

Embodiment 14

The system of any of embodiments 10-13, where causing a security mitigation action further comprises at least one of isolating the third device from the network or generating notification.

Embodiment 15

Computer storage media storing computer-useable instructions that, when used by one or more computing devices, cause the one or more computing devices to perform operations comprising: receiving behavioral information from a first device and a second device in a network, the behavioral information of the first device and the behavioral information of the second device each indicating that a third device has an inactive operational status in the network; based on the received behavioral information from the first device and the second device and based on each indication from the first device and the second device that the third device has the inactive operational status, generating an abnormality score for the third device using anomaly detection logic; determining that the abnormality score exceeds an anomaly threshold; and based on the abnormality score exceeding the anomaly threshold, causing a security mitigation action.

Embodiment 16

The media of embodiment 15, wherein (1) the behavioral information from the first device includes (a) health information of the first device and (b) observation data of the second device and the third device, and (2) the behavioral information from the second device includes (a) health information of the second device and (b) observation data of the first device and the third device.

Embodiment 17

The media of any of embodiments 15-16, further comprising: aggregating the behavioral information from the first and second devices; and indexing health information and observation data of the first device with health information and observation data of the second device such that the operational status of the third device is determined based on the indexing aggregating the behavioral information from the first and second devices

Embodiment 18

The media of any of embodiments 15-17, wherein using anomaly detection logic comprises a trained machine-learning model.

Embodiment 19

The media of any of embodiments 15-18, wherein determining the inactive operational status of the third device comprises utilizing Address Resolution Protocol (ARP) to map a network address of the third device to a physical address of the third device.

Embodiment 20

The media of any of embodiments 15-19, wherein causing a security mitigation action further comprises at least one of isolating the third device from the network or generating a notification.

What is claimed is:
1. A computer-implemented method comprising:
receiving behavioral information from a first device and a second device in a network, the behavioral information of the first device and the behavioral information of the second device each indicating that a third device has an inactive operational status in the network, the behavioral information, from the first device, comprising:
health information, of the first device, indicating that the first device has an active operational status in the network; and
observation data of the second device and the third device;
the behavioral information from the second device comprising:
health information, of the second device, indicating that the second device has the active operational status in the network; and
observation data of the first device and the third device;
based on the received behavioral information from the first device and the second device and based on each indication from the first device and the second device that the third device has the inactive operational status, generating an abnormality score for the third device using anomaly detection logic;
determining that the abnormality score exceeds an anomaly threshold; and
based on the abnormality score exceeding the anomaly threshold, causing a security mitigation action.
2. The method of claim 1, wherein the health information comprises a keepalive beacon and observation data comprises MAC addresses and device names.
3. The method of claim 2, wherein the observation data of the first and second devices includes the operational status of the third device in the network.
4. The method of claim 1, further comprising:
aggregating the behavioral information from the first and second devices; and
indexing the health information and observation data of the first device with the health information and observation data of the second device such that the operational status of the third device is determined based on the indexing.
5. The method of claim 1, wherein using anomaly detection logic comprises a trained machine-learning model.
6. The method of claim 1, wherein determining the inactive operational status of the third device comprises utilizing Address Resolution Protocol (ARP) to map a network address of the third device to a physical address of the third device.

7. The method of claim 6, wherein the first device includes a software agent utilizing reverse DNS resolution to report device names of the second and third devices based on utilizing the ARP.

8. The method of claim 1, wherein causing a security mitigation action further comprises at least one of isolating the third device from the network or generating a notification.

9. The method of claim 1, wherein the anomaly threshold increases or decreases based on activity within the network.

10. An abnormal computer behavior detection system comprising:
a hardware processor; and
computer-readable media having executable instructions embodied thereon, which, when executed by the hardware processor, cause the hardware processor to execute:
an abnormal behavior detector configured to:
receive behavioral information from a first device and a second device in a network, the behavioral information from the first device comprising (1a) health information of the first device and (1b) observation data of the second device and the third device, and the behavioral information from the second device comprising (2a) health information of the second device and (2b) observation data of the first device and the third device, the behavioral information of the first device and the behavioral information of the second device each indicating that a third device has an inactive operational status in the network;
based on receiving the behavioral information from the first device and the second device and based on each indication from the first device and the second device that the third device has the inactive operational status, generate an abnormality score for the third device using anomaly detection logic;
determine that the abnormality score exceeds an anomaly threshold; and
based on the abnormality score exceeding the anomaly threshold, cause a security mitigation action.

11. The system of claim 10, further comprising:
aggregating the behavioral information from the first and second devices; and
indexing the health information and the observation data of the first device with the health information and the observation data of the second device such that the operational status of the third device is determined based on the indexing aggregating the behavioral information from the first and second devices.

12. The system of claim 10, wherein using anomaly detection logic comprises a trained machine-learning model.

13. The system of claim 10, wherein causing a security mitigation action further comprises at least one of isolating the third device from the network or generating a notification.

14. The system of claim 10, wherein the anomaly threshold increases or decreases based on activity within the network.

15. A computer storage media storing computer-useable instructions that, when used by one or more computing devices, cause the one or more computing devices to perform operations comprising:
receiving behavioral information from a first device and a second device in a network, the behavioral information of the first device and the behavioral information of the second device each indicating that a third device has an inactive operational status in the network, the behavioral information, from the first device, comprising:
health information, of the first device, indicating that the first device has an active operational status in the network; and
observation data of the second device and the third device;
the behavioral information from the second device comprising:
health information, of the second device, indicating that the second device has the active operational status in the network; and
observation data of the first device and the third device;
based on the received behavioral information from the first device and the second device and based on each indication from the first device and the second device that the third device has the inactive operational status, generating an abnormality score for the third device using anomaly detection logic;
determining that the abnormality score exceeds an anomaly threshold; and
based on the abnormality score exceeding the anomaly threshold, causing a security mitigation action.

16. The computer storage media of claim 15, further comprising:
aggregating the behavioral information from the first and second devices; and
indexing the health information and observation data of the first device with the health information and observation data of the second device such that the operational status of the third device is determined based on the indexing aggregating the behavioral information from the first and second devices.

17. The computer storage media of claim 15, wherein using anomaly detection logic comprises a trained machine-learning model.

18. The computer storage media of claim 15, wherein determining the inactive operational status of the third device comprises utilizing Address Resolution Protocol (ARP) to map a network address of the third device to a physical address of the third device.

19. The computer storage media of claim 15, wherein causing a security mitigation action further comprises at least one of isolating the third device from the network or generating a notification.

20. The computer storage media of claim 15, wherein the anomaly threshold increases or decreases based on activity within the network.

* * * * *